United States Patent Office 2,899,421
Patented Aug. 11, 1959

2,899,421
MONOAZO-DYESTUFFS INSOLUBLE IN WATER

Ernst Fischer, Offenbach am Main, Germany, assignor to Farbwerke Hoechst Aktiengesellschaft vormals Meister Lucius & Bruning, Frankfurt am Main, Germany, a corporation of Germany No Drawing. Application March 18, 1957
Serial No. 646,580

Claims priority, application Germany March 23, 1956

4 Claims. (Cl. 260—204)

The present invention relates to new monoazo-dyestuffs insoluble in water, more particularly it relates to dyestuffs corresponding to the following general formula

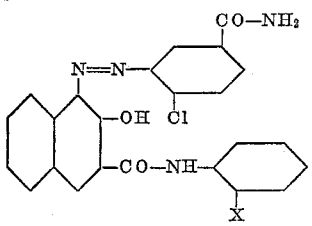

wherein X represents hydrogen or an alkoxy group. I have found that valuable monoazo-dyestuffs insoluble in water are obtained by coupling the diazonium compound of 1-amino-2-chlorobenzene-5-carboxylic acid amide with an arylamide of 2,3-hydroxynaphthoic acid of the general formula

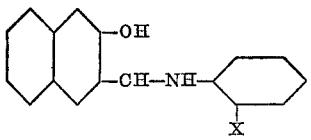

wherein X represents hydrogen or an alkoxy group. The dyestuffs prepared in substance in the manner described above can be applied to textiles by padding or printing in the presence of binding agents and they can also be used for the production of spun-dyed acetate rayon and viscose rayon by incorporating them in the spinning solutions. They yield orange colored shades of high brilliancy. The dyestuffs are also suitable for preparing color lakes and for the production of colored films by incorporating them in compositions containing cellulose esters or cellulose ethers. They can likewise be used for coloring natural and artificial resins, such as the condensation products of formaldehyde with urea, phenols or amines, furthermore, for coloring rubber and polyvinyl compounds.

From German Patent No. 921,592 it is known to use water-insoluble monoazo-dyestuffs obtained by coupling the diazonium-compound of 1-amino-2-chlorobenzene-5-carboxylic acid amide with 2,3-hydroxynaphthoic acid arylamides of a definite composition for coloring polyvinyl compounds. The 2,3-hydroxynaphthoic acid arylamides described in this patent differ in their chemical structure from the coupling components used in the present invention by a multiple substitution in the arylamide radical, which causes a distinct change and dulling of shade.

For instance, the dyestuff from diazotized 1-amino-2-chlorobenzene-5-carboxylic acid amide and 1-(2',3'-hydroxynaphthoylamino) - 2,4 - dimethoxy-5-chlorobenzene, described in the table of German Patent No. 921,592 does not yield brilliant orange tints but only brownish-red colorations which, moreover, are distinctly inferior with regard to their fastness to light to the dyeings produced with the new dyestuffs.

The following examples serve to illustrate the invention, but they are not intended to limit it thereto, the parts being by weight.

Example 1

8.6 parts of 1-amino-2-chlorobenzene-5-carboxylic acid amide are diazotized in the usual manner. In order to remove the excess of mineral acid, sodium acetate is added to the diazo-solution, which is then stirred into an aqueous suspension of 15.4 parts of 1-(2',3'-hydroxynaphthoylamino)-2-ethoxybenzene, the suspension being prepared by dissolving the latter compound in dilute caustic soda solution and precipitating it with acetic acid. The dyestuff, which is rapidly formed by heating to 40°, is filtered off when the coupling is complete, washed well and dried. It is an orange colored powder which can be used for the production of a pigment print on textile materials by one of the usual methods, for instance, by using an emulsion of polyvinyl acetate and the water-soluble, hardenable condensation product of urea and formaldehyde. The print so obtained has a vivid orange tint and possesses good fastness properties, especially a good fastness to wet processing.

When the finely dispersed dyestuff is incorporated in a viscose spinning solution, there is obtained by spinning a brilliant thread with a bright orange tint which has a very good fastness to wet processing and an excellent fastness to light.

By using in the above example 14.7 parts of 1-(2',3'-hydroxynaphthoylamino)-2-methoxybenzene instead of 15.4 parts of 1-(2',3'-hydroxynaphthoylamino)-2-ethoxybenzene, a dyestuff of similar shade and similar fastness properties is obtained.

Example 2

8.6 parts of 1-amino-2-chlorobenzene-5-carboxylic acid amide are diazotized in the usual manner. The diazo-solution is rendered neutral to Congo- paper with sodium acetate and then stirred into a suspension of 13.2 parts of 2,3-hydroxynaphthoylaminobenzene, prepared by dissolving the compound in dilute caustic soda solution and precipitating it with acetic acid. The orange colored dyestuff so obtained is filtered off, washed well and dried. Lakes prepared with this dyestuff yield vivid orange tints of a good fastness to oil and to light.

I claim:

1. The water-insoluble monoazo-dyestuffs corresponding to the following general formula

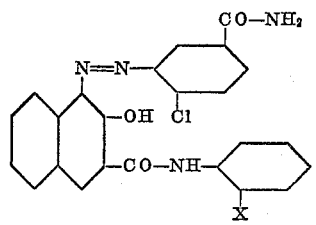

wherein X represents a member selected from the group consisting of hydrogen, methoxy and ethoxy.

2. The water-insoluble monoazo-dyestuff corresponding to the following formula

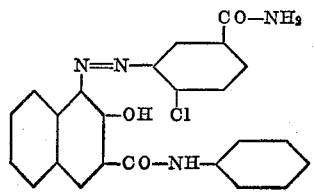

3. The water-insoluble monoazo-dyestuff corresponding to the following formula
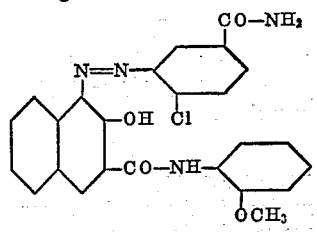
4. The water-insoluble monoazo-dyestuff corresponding to the following formula
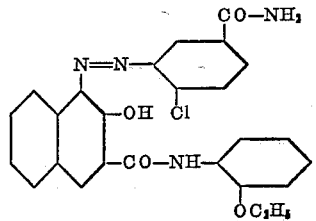
References Cited in the file of this patent
UNITED STATES PATENTS
| | | |
|---|---|---|
| Re. 19,527 | Laska et al. | Apr. 9, 1935 |
| 2,064,332 | Zwilgmeyer | Dec. 15, 1936 |
FOREIGN PATENTS
| | | |
|---|---|---|
| 921,592 | Germany | Dec. 23, 1954 |